United States Patent
Johnson et al.

(10) Patent No.: US 6,975,599 B1
(45) Date of Patent: Dec. 13, 2005

(54) RATE ADAPTIVE PAYLOAD TRANSMISSION FOR LOCAL AREA NETWORKS

(75) Inventors: Ian Johnson, Bristol (GB); Zhimin Shao, Bristol (GB); Michael Lawton, Colchester (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 948 days.

(21) Appl. No.: 09/869,421

(22) PCT Filed: Oct. 26, 2000

(86) PCT No.: PCT/GB00/04148

§ 371 (c)(1),
(2), (4) Date: Jun. 27, 2001

(87) PCT Pub. No.: WO01/31853

PCT Pub. Date: May 3, 2001

(30) Foreign Application Priority Data

Oct. 28, 1999 (EP) .................................. 99308518

(51) Int. Cl.$^7$ .......................................... H04B 7/005

(52) U.S. Cl. ...................... 370/278; 370/236; 370/389; 370/445

(58) Field of Search ............................... 370/342, 468, 370/278, 329, 328, 236, 252, 401, 389, 445; 455/67.14

(56) References Cited

U.S. PATENT DOCUMENTS

| 5,483,676 | A | 1/1996 | Mahany et al. .......... 455/67.14 |
| 5,706,428 | A | 1/1998 | Boer et al. ................... 370/342 |
| 5,914,959 | A | 6/1999 | Marchetto et al. .......... 370/468 |
| 6,389,010 | B1 * | 5/2002 | Kubler et al. ............... 370/353 |

FOREIGN PATENT DOCUMENTS

| EP | 0 402 954 | 12/1990 | ............ H04N 7/13 |
| EP | 0 948 154 | 10/1999 | ............. H04L 1/18 |
| WO | WO 97/21294 | 6/1997 | ............ H04L 12/28 |
| WO | WO 97/24843 | 7/1997 | ............ H04L 12/56 |
| WO | WO 98/37669 | 8/1998 | ............ H04L 12/56 |
| WO | WO 98/51067 | 11/1998 | ............ H04M 11/06 |

* cited by examiner

Primary Examiner—John Pezzlo
(74) Attorney, Agent, or Firm—Foley & Lardner LLP

(57) ABSTRACT

A method of communication between computing entities in a local area network operating an CSMA protocol in an environment where reflections of omni-directional transmissions from a plurality of objects cause multi-path fading includes data packets being transmitted having a header at a first, lower data rate, followed by transmission of payload data at a second, higher data rate. Where the packets are not confirmed to be received, the packet is retransmitted a predetermined number of times before the transmitting entity reduces the payload data rate of the packet and retransmits the packet. If the retransmitted lower payload data rate packet is not confirmed to be received within the predetermined number of transmissions at the lower rate, the packet is dropped.

10 Claims, 8 Drawing Sheets

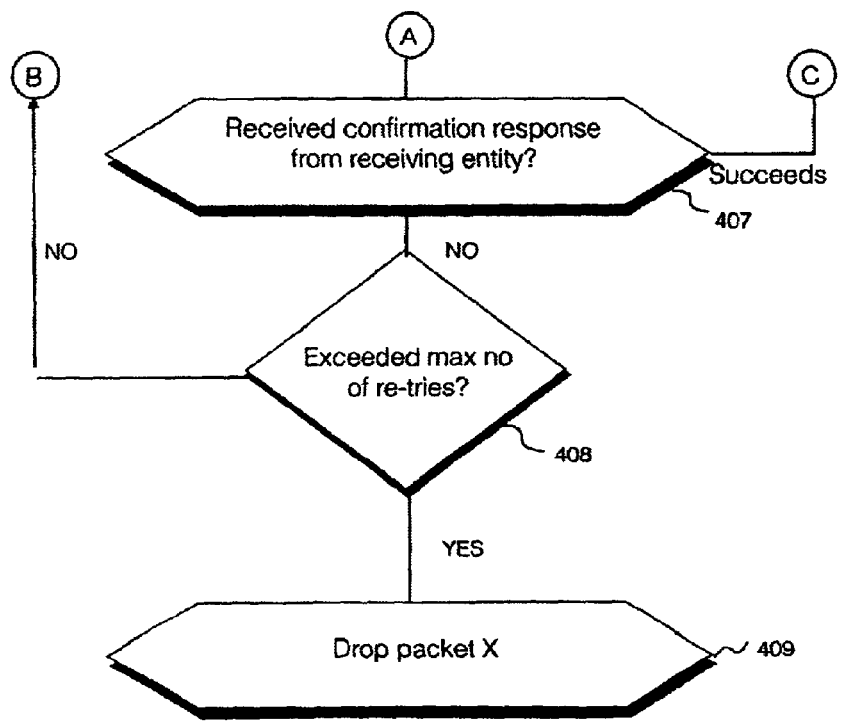
Fig. 4 (Continue)

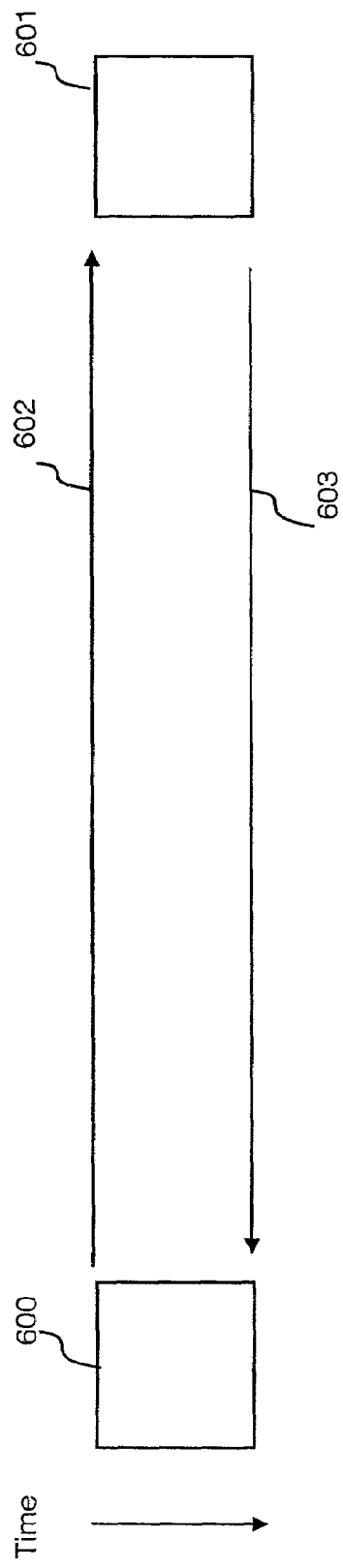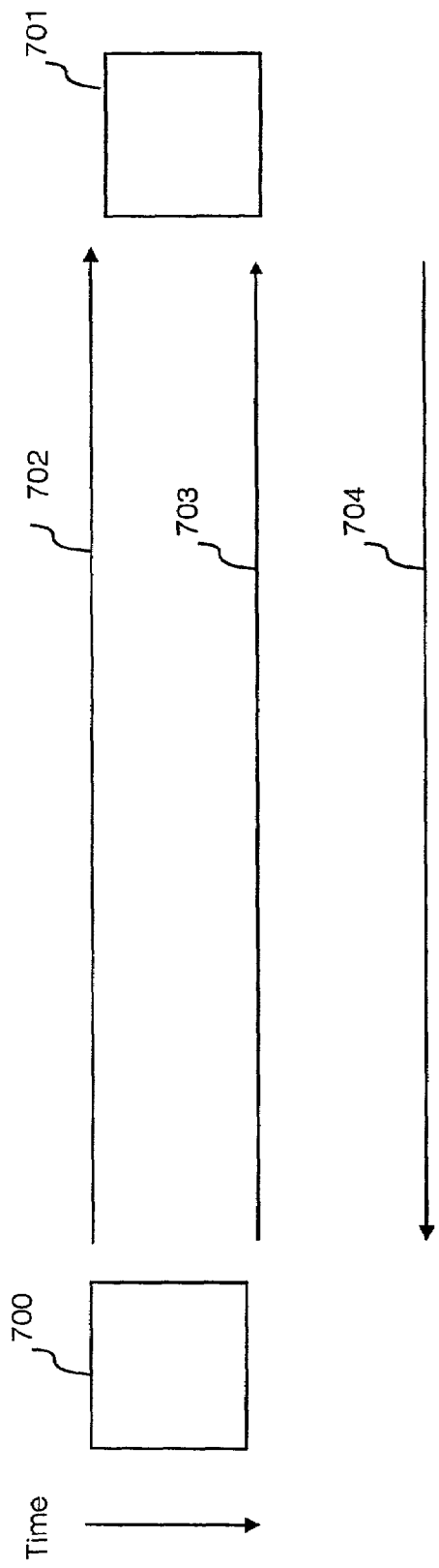

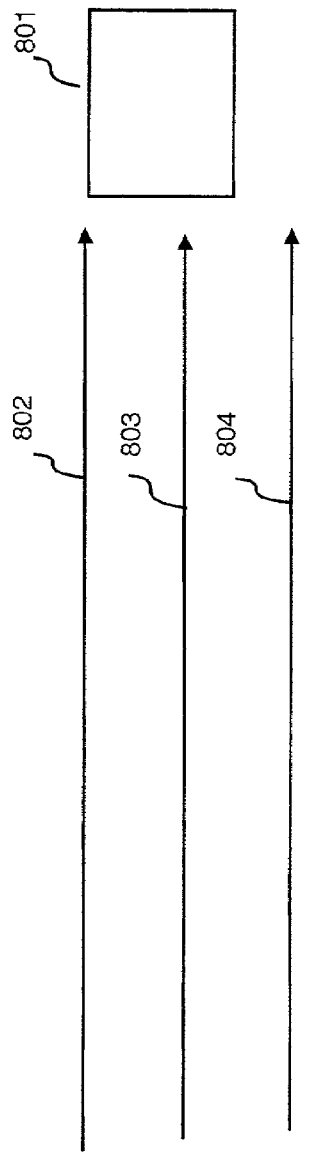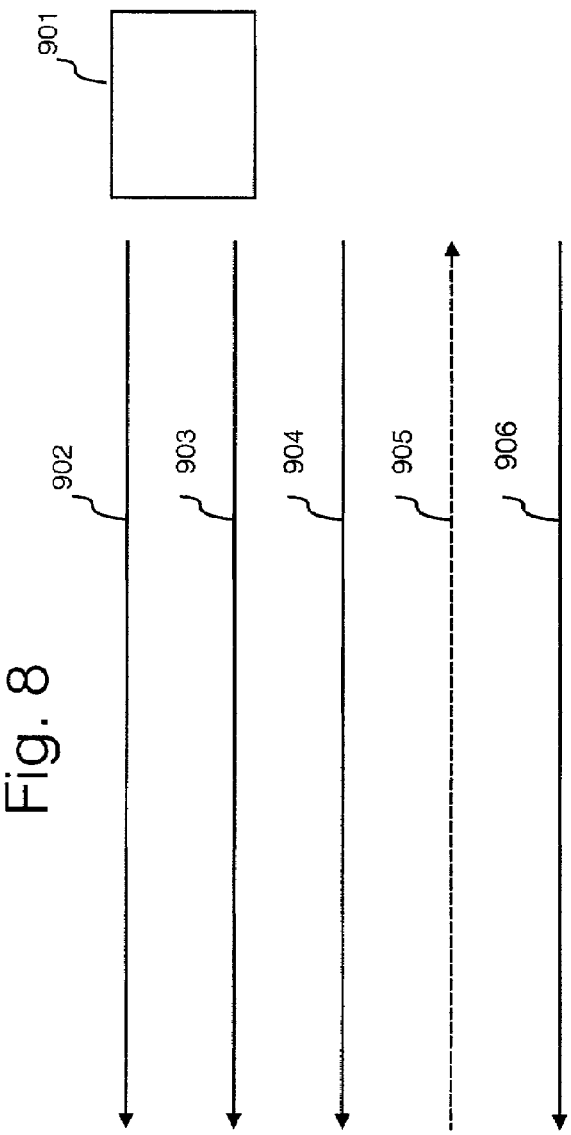

RATE ADAPTIVE PAYLOAD TRANSMISSION FOR LOCAL AREA NETWORKS

FIELD OF THE INVENTION

The present invention relates to local area networks comprising a plurality of node elements communicating with each other by wireless links.

BACKGROUND TO THE INVENTION

Conventional local area networks comprising a plurality of computing entities, for example personal computers (PCs) transmit and receive signals with each other according to known protocols, such as the Ethernet protocol, over coaxial cables connected between Ethernet ports provided at each of the individual computing entities. Whilst cabled network solutions are very successful commercially and technically, they have a disadvantage in flexibility of usage and cost. For example in a typical office environment provision needs to be made for cabling between computing entities, such as raised flooring. Although a cable solution itself is relatively inexpensive, there are hidden costs in provided ducting for cabling between computing entities.

A known solution which removes the need for coaxial cable extending between different computing entities in a local area network involves each computing entity being provided with a transmitter/receiver device which operates at wireless frequencies, typically 5 GHz. Such short range communications are practical within enclosed indoor environments for communicating over short distances of the order of meters to tens of meters at relatively low power. A plurality of computing entities linked together in a local area network use wireless links to communicate with each other. Within a particular network, the plurality of entities all communicate with each other on a single frequency channel, of frequency of the order 5 GHz using a CSMA protocol in which a sending entity transmits a plurality of data packets with all entities in a network receiving the data packets at the same carrier frequency. The packet contains a header information which includes an address of a particular computing entity for which the packet is intended. The address information is added by a higher level protocol than CSMA. Only the computing entity whose address is included in the header decodes the packet. According to the CSMA protocol, to avoid two or more computing entities transmitting at the same time on a same frequency, the CSMA protocol includes transmission rules which allows or denies each computing entity permission to transmit. Therefore only one computing entity transmits at any one time, and all computing entities receive the transmission, but only computing entities to whom the packet header is addressed decode the packets.

Referring to FIG. 1 herein, there is illustrated schematically first and second computing entities 100, 101 in an indoor office environment communicating with each other. First computing entity 100 comprising a personal computer transmits a message for printing a document, to second computing entity 101, in this example a printer device. In order for the computing entities to be physically moved around relative to each other so that computers, printers, peripheral devices and the like comprising the computing entities in the network can be placed anywhere within a local area, each entity transmits and receives omni-directionally. However, in an indoor environment, such as an office, domestic premises or laboratory there exist a large number of obstacles and reflective surfaces, including walls, heating radiators, doors, ceilings, floorings, filing cabinets and the like, all of which reflect transmissions. Further, the reflective properties of the indoor environment may change dynamically, for example with people walking in and out of the environment, doors or windows opening and closing, new objects being introduced into the area or existing objects being removed from the area.

Receiving entity 101 may receive transmissions from transmitting entity 100 over a large plurality of transmission paths due to reflections in the environment of the local area network, as illustrated schematically by path arrows 102–105 in FIG. 1. Receiving entity 101 receiving multipath transmission may experience fading due to out-of-phase cancellation from transmissions received over different paths. The problem of fading increases with the rate of data transmission over the network, since inter-symbol interference between received digital pulses increases with increasing data rate, and is also dependent upon the pulse period and the period between the transmission of individual pulses.

SUMMARY OF THE INVENTION

Specific implementations of the present invention aim to provide a robust transmission and reception protocol which overcomes or alleviates reception problems caused by multipath fading and reflections in the transmission environment.

According to first aspect of the present invention there is provided a method of operating a computer entity for communicating over a local area wireless link, said computing entity comprising at least one processor, at least one memory means, at least one transmitter and at least one receiver, said method comprising the steps of:

performing at least once, a higher data rate transmission of a data packet comprising a header data and a payload data, wherein said header data is transmitted at a first transmission data rate and said payload data is transmitted at a second transmission data rate, said second data rate being higher than said first data rate, said header data containing a field describing said second transmission data rate of said payload data;

monitoring for receipt of a confirmation signal, said confirmation signal confirming that said data packet has been received;

monitoring a number of said higher data rate transmissions made;

if a number of said higher data rate transmissions of said data packet have been made which exceeds a first predetermined number, and said confirmation signal is not received, then performing at least one lower rate transmission of said data packet, wherein said header data is transmitted at said first data rate and said packet data is transmitted at a data rate being lower than said second transmission data rate;

monitoring a number of said lower data rate transmissions of said data packet; and if a number of said lower data rate transmissions exceeds a second predetermined number, and said confirmation signal is not received, dropping said data packet.

Said step of performing a higher rate transmission of a data packet may be performed at least two times.

Said step of performing a lower data rate transmission of a data packet may be performed at least twice.

The first pre-determined number may be set at a value of at least two, such that the data packet is sent at the higher data rate transmission at least twice.

The same pre-determined number may be set at a value of at least two, such that the lower data rate transmission is made at least twice prior to dropping the data packet.

The invention includes a computer entity capable of communicating over a local area wireless link, said computer entity comprising at least one processor; at least one memory means; at least one transmitter, at least one receiver; wherein said computer entity further comprises means for controlling a first higher rate of transmission of a data packet comprising header data and payload data, for transmission of said header data at a first data transmission rate and transmission of said payload data at a second transmission data rate, said second data rate being higher than said first data rate, said header data containing a field describing a transmission data rate of said payload data; means for monitoring receipt of a confirmation signal for confirming that said data packet has been received; timing means for timing at least one pre-determined time period for monitoring receipt of said confirmation signal; said computer entity operating to: perform at least once, a higher data rate transmission of a data packet comprising a header data and a payload data, wherein said header data is transmitted at a first transmission data rate and said payload data is transmitted at a second transmission data rate, said second data rate being higher than said first data rate, said header data containing a field describing said second transmission data rate of said payload data; monitor for receipt of a confirmation signal, said confirmation signal confirming that said data packet has been received; monitor a number of said higher data rate transmissions made; if a number of said higher data rate transmissions of said data packet have been made which exceeds a first predetermined number, and said confirmation signal is not received, then performing at least one lower data rate transmission of said data packet, wherein said header data is transmitted at said first data rate and said packet data is transmitted at a data rate being lower than said second transmission data rate; monitoring a number of said lower data rate transmissions of said data packet; and if a number of said lower data rate transmissions exceed a second predetermined number, and said confirmation signal is not received, dropping said data packet.

The computer entity may further operate such that said step of performing a higher data rate transmission of a data packet is performed at least two times.

The computer entity may further operate such that said step of performing a lower data rate transmission of a data packet is performed at least two times.

The computer entity may be pre-configured such that said first pre-determined number is set at a value of at least two.

The computer entity may be pre-configured such that said second predetermined number is set at a value of at least two.

The invention includes a computing entity for communicating over a local area wireless link, said computing entity is configured for receiving a plurality of packet data transmitted over said local area wireless link, said computing entity comprising: at least one processor; at least one memory means; at least one transmitter; at least one receiver means, said receiver means operating for receiving a header data of said data packet, said header data received at a first data rate; decoding means for decoding a rate field of said header data to obtain a data rate information specifying a data rate at which a payload data of said data packet is to be received, said receiver receiving said payload data at said specified data rate; means for verifying that said data packet is correctly received; and means for generating a confirmation signal confirming receipt of said data packet, and sending said confirmation signal via said transmitter.

BRIEF DESCRIPTION OF THE DRAWINGS

For a better understanding of the invention and to show how the same may be carried into effect, there will now be described by way of example only, specific embodiments, methods and processes according to the present invention with reference to the accompanying drawings in which:

FIG. 6 herein illustrates schematically a successfully transmission of a multi-data rate packet between transmitting and receiving entities in a local area network according to a specific method of the present invention;

FIG. 7 illustrates schematically a successful retransmission of a multi-data rate packet between transmitting and receiving entities according to the specific method of the present invention;

FIG. 8 illustrates schematically a failed transmission and retransmission and successful third transmission of a multi-data rate packet between a transmitting entity and a receiving entity according to the specific method of the present invention; and FIG. 9 illustrates schematically an unsuccessful communication of a multi-data rate packet on first, second and third attempts between a transmitting entity and a receiving entity, followed by a successful communication of a packet data having a lower payload data rate and confirmation of successful receipt of the packet by the receiving entity according to the specific method of the present invention.

DETAILED DESCRIPTION OF THE BEST MODE FOR CARRYING OUT THE INVENTION

There will now be described by way of example the best mode contemplated by the inventors for carrying out the invention. In the following description numerous specific details are set forth in order to provide a thorough understanding of the present invention. It will be apparent however, to one skilled in the art, that the present invention may be practiced without limitation to these specific details. In other instances, well known methods and structures have not been described in detail so as not to unnecessarily obscure the present invention.

In this specification, the term "local area network" is used to describe a plurality of computing entities which are interconnected to communicate with each other over a local area. The geographical extent of a local area can range from the order of a few meters to a few tens of meters. In the best mode implementation described herein, wireless links are designed and optimized to operate over distances of around 10 meters between transmitting and receiving computer entities.

Figure 1:
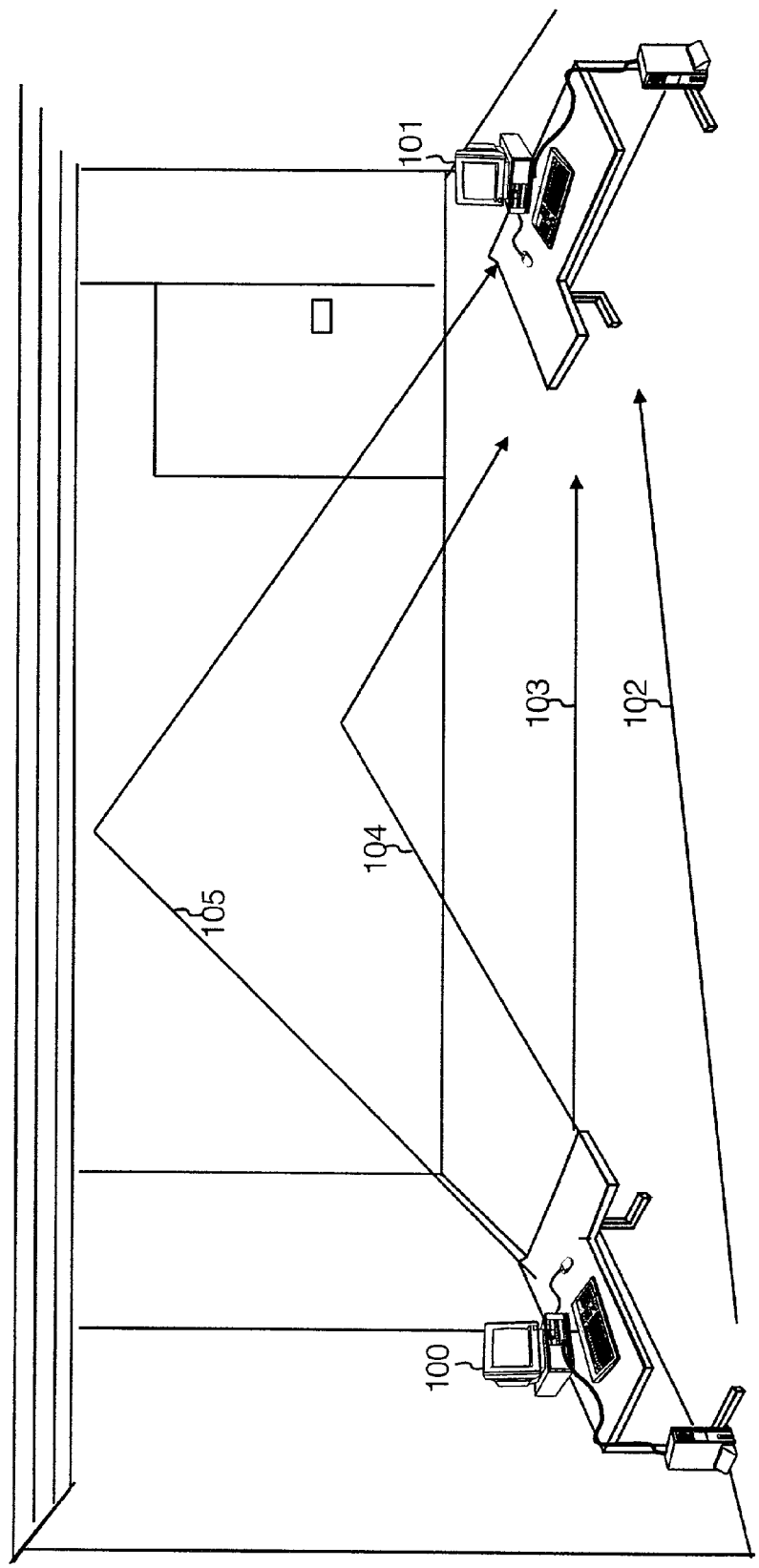
FIG. 1 illustrates schematically a local area network comprising a plurality of computing entities communicating with each other over wireless links in a reflective indoor environment.
Figure 2:
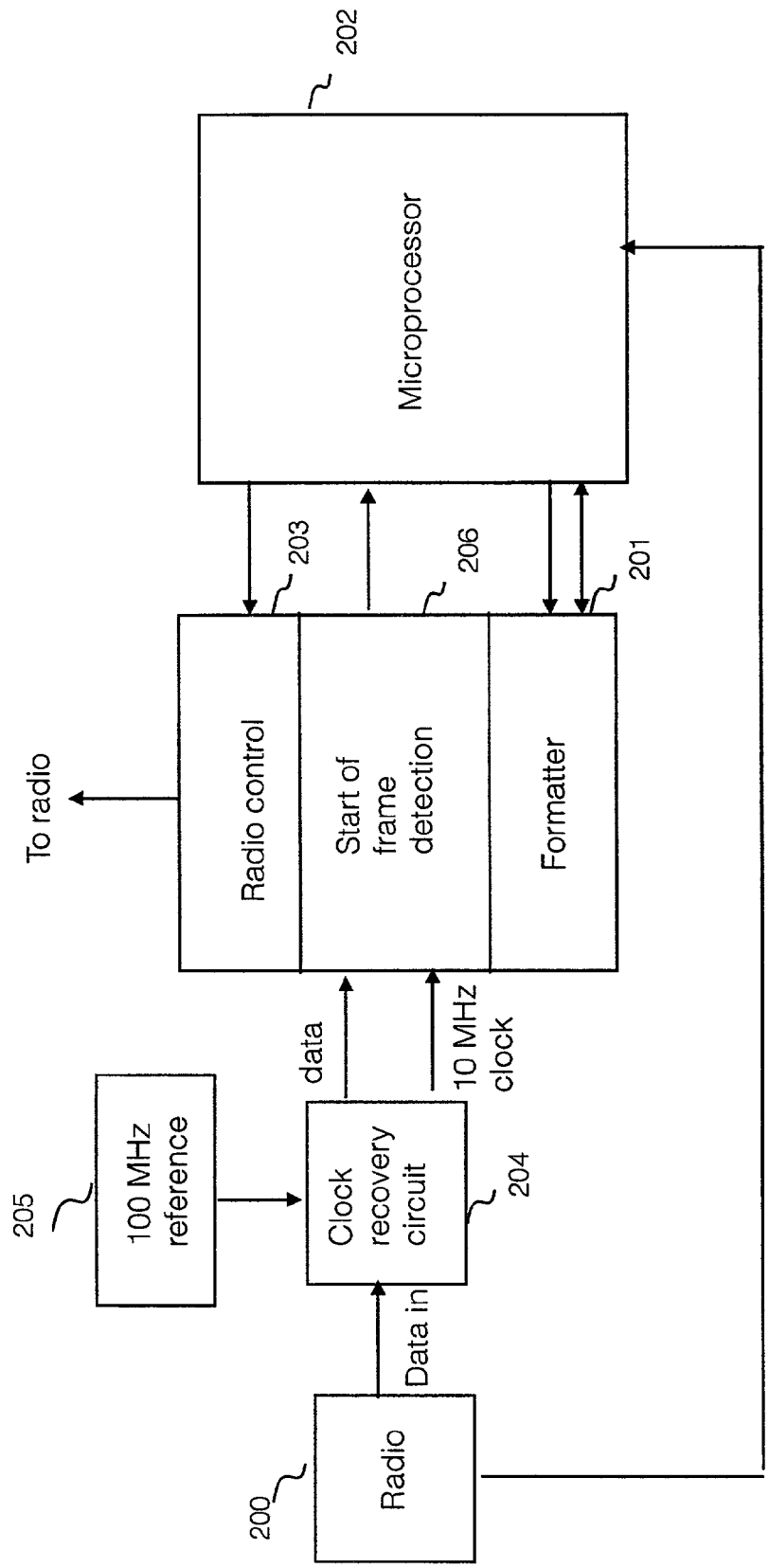
FIG. 2 illustrates schematically a communications port card component provided for each computing entity, containing a transmitter and receiver for communicating between computing entities according to a specific implementation of the present invention.

Referring to FIG. 2 herein there is illustrated schematically a transmitter—receiver port card suitable for use in each computing entity of the network for communicating between entities. The card comprises a super heterodyne architecture transmitter and receiver element 200 for transmitting and receiving signals at a nominal center frequency of 5.86 GHz, with intermediate frequencies at 1490 MHz and 70 MHz. The transmitter applies modulation to the 1490 MHz intermediate frequency for transmitting bit pulses. It will be understood by those skilled in the art that those frequencies applied in this case is a specific implementation and in the general case, these frequencies may be varied. The port card comprises a dipole antenna for transmission and reception at the operating frequency. On a transmission path, there is provided a formatter circuit 201 which appends a header data to each of a plurality of packets of data prior to transmission and scrambles the data by combining the data with a maximal length sequence. The formatter circuit 201 receives payload data from a micro-processor 202. A header data is pre-pended to each payload data to form a corresponding representative packet. Micro-processor 202 controls transmission of the packets by controlling the transmitter 200 via transmitter/receiver control circuit 203.

A receive circuit comprises the receiver 200, which inputs received RF data to a clock recovery circuit 204. Starter frame detection circuit 206 forms packet synchronization by comparing the header data of received data packets with a stored reference sequence of data. A packet is deemed to have arrived if a detected sequence of 32 bits exactly matches the referenced sequence. Once the packet has been detected, a length field comprising the header data of the packet is read so that a position of the end of the packet can be determined. This information is passed to processor 202 so that the packet can be processed for a cyclical redundancy check (CRC).

Control circuit 203 passes control signals to the transmitter/receiver 200 which includes control signals to switch the transmitter/receiver between receive and transmit modes. With the exception of the clock recovery circuit 205 which operates at 100 MHz, the rest of the circuit operates at 10 MHz, this being compatible with the highest data rate.

The transmitter and receiver elements of the port card of FIG. 2 are designed to operate at a carrier frequency suitable for indoor usage, for example 5 GHz or thereabouts. All computer entities within a network have port cards which operate at the same carrier frequency and transmission of messages by each computer entity is controlled according to a known access control protocol, for example the known CSMA protocol. Data transmission rates are selected such that in normal usage an average data transmission rate between computing entities is sufficiently high to carry continuous data over a transmission link, taking account of any interruptions in transmission and reception which may occur as a result of lost data due to multi-path fading at higher data rates, interruptions in transmission paths due to passage of obstacles, movement of people and the like in the environment in which the network operates. For example where video data is transmitted at 1.5 MBits/s then the average design data rate over a prolonged period must be greater than 1.5 MBits/s in order to carry this traffic. In the best mode implementation, transmission of packetized data is made at a plurality of data rates, which may be above and below the average design data rate over which a link must operate. When conditions of poor transmission are encountered at a higher data rate, a transmitting entity automatically lowers the rate of data transmission to a rate at which reception of the transmission is more likely to be successful. Transmission between computing entities is made by means of a plurality of packets transmitted by a transmitting entity for reception by a receiving entity. Upon successful receipt of a packet by the receiving entity, the receiving entity transmits a confirmation signal back to the transmitting entity, so that the transmitting entity is able to determine that the packet has been successfully received over the wireless link.

Figure 3:
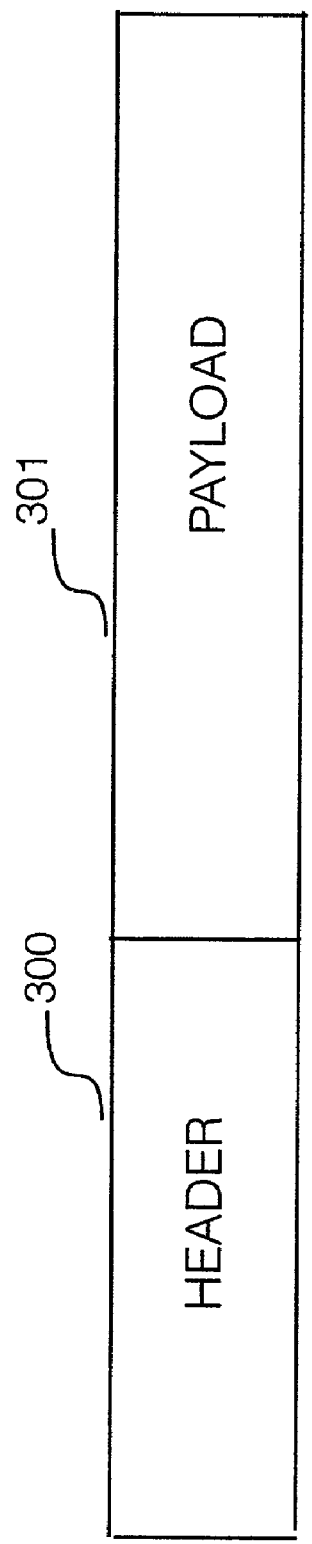
FIG. 3 illustrates schematically a data packet transmitted and received between computing entities in a local area network according to the specific implementation of the present invention.

Referring to FIG. 3 herein, there is illustrated schematically a single data packet used for transmission over the wireless link. The packet comprises a header portion 300 containing data bytes identifying the intended recipient computing entity of the packet, synchronization data for enabling the receiving entity to synchronize with the packet, and data describing a data rate at which a remaining payload portion 301 of the packet is about to be transmitted by the transmitting entity. The header portion 300 is always transmitted at a first data rate, which is comparatively low. For example the first data rate may be 1 MBit/s, whereas a second portion of the packet containing payload data can be but is not always transmitted at a second data rate, the second data rate being higher than the first data rate. For example the payload data part of the packet may be transmitted at 10 MBits/s. Alternatively, the transmitter may transmit the payload data portion of the packet at a third data rate, the third data rate being lower than the second data rate. For example in the best mode herein, a first data rate of 1 MBit/s may be used for transmission of the header data, and the second data rate, in the best mode herein 10 MBits/s is used for the payload data. The third data rate, used for a lower payload data rate is 1 Mbits/s.

The first data rate used for transmission of the header portion is selected to be low enough such that under a wide variety of environments, reception by a receiving entity of the network has a high degree of reliability. Selection of the second data rate used for payload transmission, which is higher than the first data rate is selected for optimum data transfer, under normal operating conditions. However, because of reflections and multi-path fading, transmission of the payload data at the higher data rate may not be as reliable as transmission of the header data at the lower data rate. According to the best mode implementation of the present invention, the transmitter attempts to transmit each payload data at a relatively high data rate to obtain as high an overall data rate as possible for data transfer over the wireless link. However, under conditions of fading or poor reception, the transmission entity reverts to a lower payload data rate in order to obtain reliable transmission. A decision on data rate transmission is taken on a per packet basis. That is to say each packet is initially attempted to be transmitted at a higher data rate and if transmission is unsuccessful, the data rate of the payload portion of the packet is reduced to a lower data rate. If the lower data rate transmission is not received within a preset number of attempts, then the packet is dropped. In this specification, the term 'dropping a data packet' means not attempting to re-transmit the data packet, ceasing to attempt to send the data packet, or ceasing to actually send the data packet. The data packet may become overwritten in an internal memory of a computer entity as a result of dropping the packet. A next packet to be transmitted is again attempted to be transmitted at the higher payload data rate initially, and if the initial transmission is not successfully confirmed by the receiving entity, the payload data portion of the packet is retransmitted at a lower data rate with a predetermined number of attempts. If after a predetermined number of attempts the lower data rate transmission is not successfully confirmed by the receiving entity, the packet is dropped by overwriting it in buffer memory of the port card.

Figure 4:
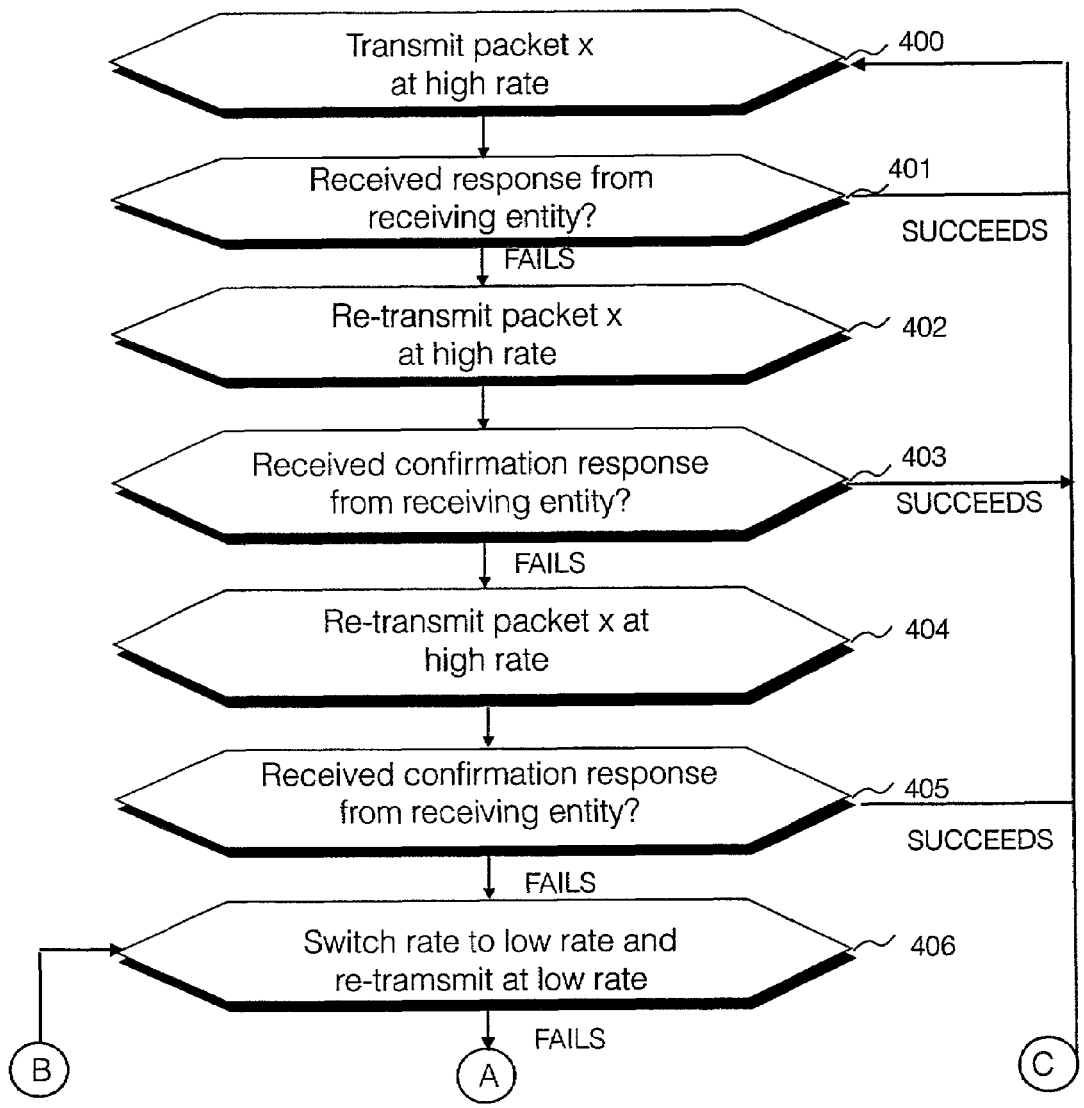
FIG. 4 illustrates schematically a transmission mode process implemented by a processor of the port card for implementing a transmission and reception protocol according to the specific implementation of the present invention.

Referring to FIG. 4 of the accompanying drawings, there is illustrated schematically a process carried out by the port card of a transmitting computer entity in a transmit mode. It will be understood by those skilled in the art that the process illustrated in FIG. 4 can be implemented by means of a general purpose processor controlled according to a computer program written in a conventional language implementing an algorithm for performing the process. Alternatively, the process may be carried out by the port card 200 implemented as a dedicated firmware implementation, the design details of which and the general implementation will be apparent to those skilled in the art.

In step 400, a transmitting computing entity transmits a first packet to a receiving entity. The header portion of the packet is transmitted at the first, lower data rate, in the best mode implementation being 1 MBit/s. The header portion contains a field comprising a byte of data, which indicates a data rate at which the remaining payload portion of the packet will be transmitted. The remaining payload portion of the data packet is transmitted at a second, higher rate, in the best mode implementation herein being 10 MBits/s. The transmitting entity then waits in a first predetermined period step 401 until a response is received from the receiving entity. If a response signal is received from the receiving entity confirming that the packet has been successfully received, at the higher data rate, then the transmitting entity inputs a next packet of the transmission and repeats step 400. However, if after a first predetermined period a confirmation response signal has not been received from the receiving entity, then in step 402 the transmitting entity proceeds to retransmit the data packet in the same manner as in step 400,. That is to say the header data is transmitted at the first, lower data rate and the payload portion of the packet is transmitted at the second, higher data rate. The header portion of the packet contains the same information as previously concerning the data transmission rate of the second portion of the packet. The packet re-transmitted is an exact retransmission of the original packet sent in step 400. The transmitting entity then waits for a confirmation response signal to be received from the receiving entity confirming that the packet has been received. If the transmitting entity receives the confirmation signal from the receiving entity, then the transmitting entity selects a new packet comprising the transmission and reverts to step 400 for transmission of a new packet. However, if after a second predetermined period the transmitting entity has not received a confirmation response signal from the receiving entity indicating that the transmission has failed, then the transmitting entity in step 404 retransmits the packet in the same manner as previously, that is to say transmission of the header data at the lower data rate, and transmission of the payload data at the higher data rate. In step 405, again, the transmitting entity awaits receipt of a confirmation signal from the receiving entity. If the confirmation signal is received within a third predetermined period, then the transmitting entity proceeds to step 400 selecting the next packet in the transmission to be transmitted and proceeds to transmit the next packet. However, if after the third predetermined period there is no confirmation signal from the receiving entity that the packet has been received, the transmitting entity has now attempted three times to transmit the packet at the higher data rate for the payload portion of the packet and has failed. Therefore, in step 406 the transmitting entity switches the payload data rate of the packet to a lower data rate and transmits the packet with the header portion at the first, lower data rate and the payload packet at a third data rate, the third data rate being lower than the second data rate. The rate of transmission of the payload portion of the packet may be the same as the rate of transmission of the header portion, or may be a third data rate between the data rate of the header portion and the higher data rate of the payload portion of the packet. For example in the best mode implementation where only two data rates are present, say for example 1 MBit/s and 10 MBits/s, in step 406 the whole of the packet will be retransmitted at the lower data rate. However, in an implementation where more than 2 data rates are used, for example a first data rate, eg 1 MBits/s is used for the header portion, and there are a selection of data rates used for the payload portion, say for example 10 MBits/s and 5 MBits/s, then the packet may be transmitted with a header portion at 1 MBits/s followed by the payload portion transmitted at a third data rate of 5 MBits/s.

In step 407, the transmitting entity waits for a fourth predetermined period, during which receipt of a confirmation signal from the receiving entity is expected.

If, within the fourth predetermined period, a confirmation signal is received from the receiving entity, indicating that the packet has been received, then the transmitting entity reverts to step 400 for transmission of the next packet. However, if after the fourth predetermined period confirmation has not been received in step 408 it is checked whether a predetermined number of transmissions of the lower data rate payload packet in step 406 have been achieved. The predetermined number of re-transmissions at the lower payload data rate is preprogrammed and optimized by carrying out trials and experimentation in user environments to determine an optimum number of retries. If the second predetermined number of retransmissions has not been achieved in step 408, then the packet is retransmitted at the lower data rate(s) in step 406. However, if the predetermined number of transmissions have been made, then in step 409 the packet is dropped by overwriting the packet in memory. If the algorithm reaches step 409, then transmission has failed at both the higher (second) payload data rate and the lower (first and/or third) payload data rates.

Figure 5:
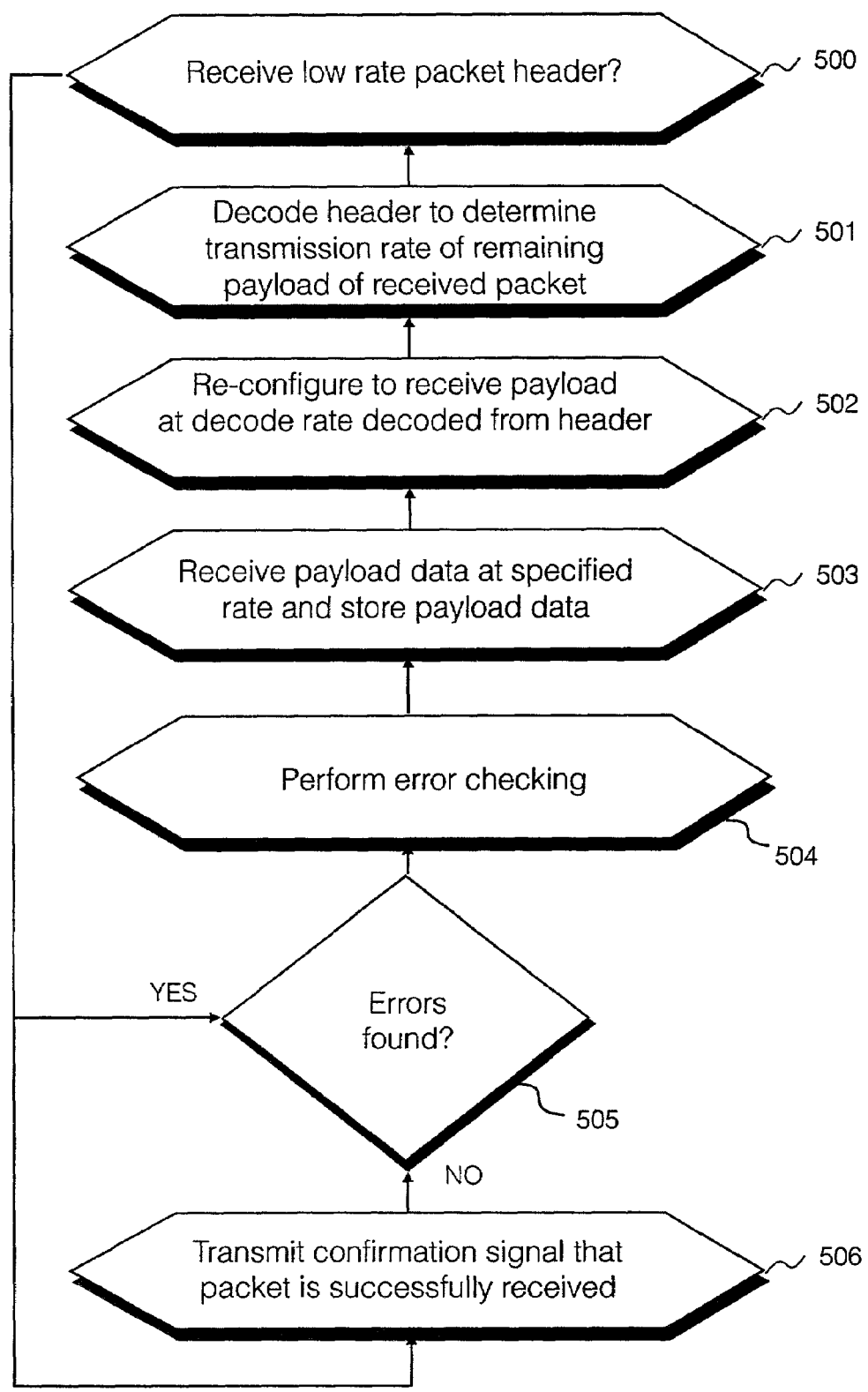
FIG. 5 illustrates schematically a reception mode process carried out by the specific embodiment of the present invention for handling receipt of packet data and confirming receipt of packet data to a transmitting entity according to the specific implementation of the present invention.

In FIG. 5, at the receiving entity the port card operates in a receiving mode according to a second algorithm. In step 500, the receiver receives a packet header at a low data rate. In step 501, the port card of the receiving computer entity decodes the header and examines the data rate field to determine the transmission rate of the remaining payload of the packet which is to be received. In step 502, if the data rate information decoded in step 501 indicates that the remainder of the payload data is to be transmitted at a higher data rate, the port card reconfigures itself to receive payload data at the higher rate by adjusting its synchronization to receive higher rate data. However, if the header field decoded in step 501 indicates that the data rate is to be the same as the date rate used for transmission of the header, then no further re-synchronization is required in step 502. In step 503, the port card of the receiving entity receives payload data at the specified payload data rate, and stores the payload data in a buffer, ready for passage to a main processor of the receiving computing entity. At this stage, checking of error detection codes and the integrity of the received payload data may occur within the port card, according to known error corrections codes. In step 504, if the payload data has been received and error correction codes have correctly decoded the payload data, the port card transmits a confirmation signal that the packet has been successfully received in step 504. The receiving entity then proceeds to await receipt of a next packet of the transmission in step 500 and procedure repeats as described hereinabove.

Referring to FIG. 6 herein, there is illustrated a set of transmissions between transmitting entity 600 and receiving entity 601 where no multi-path fading occurs and transmission of the higher data rate payload packet occurs successfully first time. Transmitting entity transmits the low header data rate, high payload data rate packet in step 602 which is successfully received by receiving entity 601. Receiving entity 601 transmits a confirmation signal 603 which is received by transmitting entity 600. Having been successfully transmitted and receipt being confirmed by the receiving entity, the transmitting entity proceeds to transmit a next packet.

Referring to FIG. 7 herein, there is illustrated schematically transmission between transmitting entity 700 and receiving entity 701 where a low data rate, header, high payload data rate packet is unsuccessfully received on first transmission. In step 702, the transmission entity transmits the data packet having low header rate and high payload data rate. However, the packet is unsuccessfully received by receiving entity 701 on the first transmission. Therefore after the first predetermined period, transmitting entity 700 retransmits the packet having low header data rate and high payload data rate in transmission 703. Transmission 703 is successfully received by receiving entity 701 which generates a confirmation signal 704 which is transmitted back to the transmitting entity 700.

Referring to FIG. 8 herein, there is illustrated schematically transmissions between transmitting entity 800 and receiving entity 801 where a data packet having low header data rate and high payload data rate is successfully received upon its third transmission, the first two transmissions 802, 803 of the packet being lost. On the third transmission of the packet 804, the packet is successfully received by receiving entity 801 which then generates confirmation signal 805 which is retransmitted back to the transmitting entity 800. On receiving the confirmation signal, the transmitting entity then proceeds to transmit a next packet in step 400.

Referring to FIG. 9 herein, there is illustrated schematically a case where transmission of a data packet having a low header data rate and higher payload data rate is unsuccessful after three attempts. Transmissions 902, 903, 904 of the high payload rate packet are made between transmitting entity 900 and receiving entity 901. The transmitting entity, after having received no response from any of the three initial packet transmissions 902–904 retransmits the same packet in transmission 905 having a low data rate header and lower data rate payload at the first or third data rates. The packet is successfully received by receiving entity 901 which generates a confirmation signal 906 which is sent back to transmitting entity 900, upon receipt of which transmitting entity 900 proceeds to select a new packet, transmitting the new packet at the higher payload data rate in step 400.

Practical tests were made on a specific embodiment according to the present invention comprising a pair of port cards each having a transmitter/receiver operating at a centre frequency of 5.8 GHz. Tests were carried out on tens of thousands of packets in a radio hostile indoor environment. The basic measurement technique was to transmit a series of packets and log information about the detected packets at the receiver. The indoor environment included a laboratory of dimensions 10 meters×10 meters×3 meters having a floor and ceiling of metal construction, one wall completely metallic and three walls being partially metallic with glass panels. Measurements indicated a delay spread of signals as high as 45 ns. Measurements were made at a second higher data rate of 10 Mbits/s and at a lower (first or third) data rate of 1 MBit/s. In both cases, a diversity receiver was used. For a typical measurement made over 50,000 received packets, transmitted between transmitter and receiver separated by approximately 7 meters, statistical information on percentage packet detection rate, packet success rate percentage, average received signals strength indicated, average error burst, and a maximum error burst were as follows:

| 10 MBits/s | |
|---|---|
| Packet detection rate percentage | 92.7 |
| Packet success rate percentage | 87.2 |
| Average RSSI | 142 (−55 dBm) |
| Average error burst | 5 |
| Maximum error burst | 173 |

| 1 MBit/s | |
|---|---|
| Packet detection rate percentage | 99.9 |
| Packet success rate percentage | 88.9 |
| Average RSSI | 148 (−52 dBm) |
| Average error burst | 1 |
| Maximum error burst | 3 |

The above results indicate that an improvement in packet detection rate and packet success rate are achieved by switching bit rate from 10 MBits/s to 1 MBit/s in a radio-hostile indoor environment.

For a less hostile environment, representing a typical domestic environment comprising a room in a building made of brick with relatively thick internal and external walls, in a room 8 meters×12 meters×2.5 meters, with a same separation of approximately 7 meters between transmitter and receiver, results for the measured parameters at 10 MBits/s and 1 MBit/s were as follows:

| 10 MBits/s | |
|---|---|
| Packet detection rate percentage | 99.2 |
| Packet success rate percentage | 98.1 |
| Average RSSI | 127 (−62 dBm) |
| Average error burst | 3 |
| Maximum error burst | 20 |
| 1 MBit/s | |
| Packet detection rate percentage | 99.9 |
| Packet success rate percentage | 98.8 |
| Average RSSI | 143 (−55 dBm) |
| Average error burst | 1 |
| Maximum error burst | 6 |

In the less hostile environment, the packet success rate and packet detection rate at 10 MBits/s are improved over a hostile environment. However there is still an improvement in packet detection rate and packet success rate to be obtained by switching payload data transmission rate to a lower data rate.

What is claimed is:

1. A method of communicating over a local area wireless link, said method comprising the steps of:
    performing at least once, a higher data rate transmission of a data packet comprising a header data and a payload data, wherein said header data is transmitted at a first transmission data rate and said payload data is transmitted at a second transmission data rate, said second data rate being higher than said first data rate, said header data containing a field describing said second transmission data rate of said payload data;
    monitoring for receipt of a confirmation signal, said confirmation signal confirming that said data packet has been received;
    monitoring a number of said higher data rate transmissions made;
    if a number of said higher data rate transmissions of said data packet has been made which exceeds a first predetermined number, and said confirmation signal is not received, then performing at least one lower rate transmission of said data packet, wherein said header data is transmitted at said first data rate and said packet data is transmitted at a data rate being lower than said second transmission data rate;
    monitoring a number of said lower data rate transmissions of said data packet; and
    if a number of said lower data rate transmissions exceeds a second predetermined number, and said confirmation signal is not received, dropping said data packet.

2. The method as claimed in claim 1, wherein said step of performing a higher rate transmission of a data packet is performed at least two times.

3. The method as claimed in claim 1, wherein said step of performing a lower data rate transmission of a data packet is performed at least two times.

4. The method as claimed in claim 1, wherein said first predetermined number is set at a value of at least two.

5. The method as claimed in claim 1, wherein said second predetermined number is set at a value of at least two.

6. A computer entity capable of communicating over a local area wireless link, said computer entity comprising a transmitter; and a receiver wherein said computer entity further comprises:
    a processor adapted to control a rate of transmission by the transmitter of a data packet comprising header data and payload data, and to monitor receipt by the receiver of a confirmation signal for confirming that said data packet has been received;
    a timer for timing at least one pre-determined time period for monitoring receipt of said confirmation signal;
    said computer entity operating to:
    perform at least once, a higher data rate transmission of a data packet comprising a header data and a payload data, wherein said header data is transmitted at a first transmission data rate and said payload data is transmitted at a second transmission data rate, said second data rate being higher than said first data rate, said header data containing a field describing said second transmission data rate of said payload data;
    monitor receipt of a confirmation signal, said confirmation signal confirming that said data packet has been received;
    monitor a number of said higher data rate transmissions made;
    if a number of said higher data rate transmissions of said data packet have been made which exceeds a first predetermined number, and said confirmation signal is not received, then performing at least one lower data rate transmission of said data packet, wherein said header data is transmitted at said first data rate and said packet data is transmitted at a data rate being lower than said second transmission data rate;
    monitoring a number of said lower data rate transmissions of said data packet; and
    if a number of said lower data rate transmissions exceed a second predetermined number, and said confirmation signal is not received, dropping said data packet.

7. The computer entity as claimed in claim 6, further operating such that said step of performing a higher data rate transmission of a data packet is performed at least two times.

8. The computer entity as claimed in claim 6, further operating such that said step of performing a lower data rate transmission of a data packet is performed at least two times.

9. The computer entity as claimed in claim 6, pre-configured such that said first pre-determined number is set at a value of at least two.

10. The computer entity as claimed in claim 6, pre-configured such that said second predetermined number is set at a value of at least two.

* * * * *